(12) United States Patent
Mulholland et al.

(10) Patent No.: US 9,219,901 B2
(45) Date of Patent: Dec. 22, 2015

(54) REACTIVE USER INTERFACE FOR HEAD-MOUNTED DISPLAY

(71) Applicant: QUALCOMM Incorporated, San Diego, CA (US)

(72) Inventors: James Joseph Mulholland, London (GB); Giuliano Maciocci, Duxford (GB)

(73) Assignee: Qualcomm Incorporated, San Diego, CA (US)

(*) Notice: Subject to any disclaimer, the term of this patent is extended or adjusted under 35 U.S.C. 154(b) by 192 days.

(21) Appl. No.: 13/800,790

(22) Filed: Mar. 13, 2013

(65) Prior Publication Data

US 2013/0336629 A1 Dec. 19, 2013

Related U.S. Application Data

(60) Provisional application No. 61/661,401, filed on Jun. 19, 2012.

(51) Int. Cl.
| | |
|---|---|
| *H04N 9/87* | (2006.01) |
| *G06F 3/0487* | (2013.01) |
| *G02B 27/01* | (2006.01) |
| *G02B 27/00* | (2006.01) |

(52) U.S. Cl.
CPC .............. *H04N 9/87* (2013.01); *G02B 27/0093* (2013.01); *G02B 27/017* (2013.01); *G06F 3/0487* (2013.01); *G02B 2027/014* (2013.01); *G02B 2027/0178* (2013.01); *G02B 2027/0187* (2013.01); *G06F 2203/04804* (2013.01)

(58) Field of Classification Search
CPC ...................... G02B 27/017; G02B 2027/0138; G02B 2027/0187; G02B 2027/0123; G02B 2027/0178; G02B 27/01; G09G 5/14; H04N 21/4223; H04N 5/7491; G06F 3/011
See application file for complete search history.

(56) References Cited

U.S. PATENT DOCUMENTS

| | | | |
|---|---|---|---|
| 7,148,860 B2 | 12/2006 | Kooi et al. | |
| 7,924,506 B2 | 4/2011 | Rieger | |
| 2002/0044152 A1 | 4/2002 | Abbott, III | |
| 2006/0256133 A1 | 11/2006 | Rosenberg | |
| 2007/0139192 A1* | 6/2007 | Wimberly et al. | ....... 340/539.22 |
| 2007/0189544 A1 | 8/2007 | Rosenberg | |
| 2009/0040233 A1 | 2/2009 | Yamamoto | |
| 2009/0273542 A1 | 11/2009 | Yamamoto | |
| 2010/0085462 A1 | 4/2010 | Sako et al. | |
| 2012/0086624 A1 | 4/2012 | Thompson et al. | |
| 2012/0212414 A1 | 8/2012 | Osterhout et al. | |
| 2012/0235902 A1 | 9/2012 | Eisenhardt et al. | |
| 2013/0141421 A1* | 6/2013 | Mount et al. | ....................... 345/8 |

OTHER PUBLICATIONS

International Search Report and Written Opinion—PCT/US2013/042222—ISA/EPO—Nov. 7, 2013.

* cited by examiner

*Primary Examiner* — Hut T Nguyen
(74) *Attorney, Agent, or Firm* — Kilpatrick Townsend & Stockton LLP

(57) ABSTRACT

Embodiments of the present invention are directed toward allowing a see-through HMD to intelligently react to sensor and other input to adjust how visual elements showing video are displayed. The HMD can react to different sensor input in different ways, enabling the HMD to provide graduated responses based on the degree and type of sensor input received. These responses may further be based on a determination of the context of the user to help ensure an intelligent, appropriate response.

32 Claims, 9 Drawing Sheets

REACTIVE USER INTERFACE FOR HEAD-MOUNTED DISPLAY

CROSS-REFERENCE TO RELATED APPLICATION

The present application is a non-provisional of and claims the benefit and priority under 35 U.S.C. 119(e) of U.S. Provisional App. No. 61/661,401, filed Jun. 19, 2012, entitled "REACTIVE USER INTERFACE FOR HEAD MOUNTED DISPLAY", the entire contents of which are incorporated herein by reference for all purposes.

BACKGROUND

A see-through head-mounted display (HMD) can provide transparent display area within a user's field of view in which a user can view both physical objects in the user's surroundings and visual elements on the display. In some situations however, such as when the user is navigating a busy environment, displayed visual elements can be distracting and/or may impair the user from viewing physical objects in his or her surroundings.

SUMMARY

Embodiments of the present invention are directed toward allowing a see-through HMD to intelligently react to sensor and other input to adjust how visual elements across the user interface are displayed. The HMD can react to different sensor input in different ways, enabling the HMD to provide graduated responses based on the degree and type of sensor input received. These responses may further be based on a determination of the context of the user to help ensure an intelligent, appropriate response.

An example method of providing a reactive video playback interface for a head-mounted display, according to the disclosure, includes causing a display of the head-mounted display to show at least one visual element including a video. The display is at least semi-transparent from a view of a user of the head-mounted display when no content is displayed. The method further includes detecting a triggering event using a first set of sensor data from one or more sensors, and changing a visibility of the video based on the triggering event while the video continues to be shown.

An example head-mounted display system, according to the disclosure, includes display means for displaying one or more visual elements to a user such that the user is able to at least selectively view the user's surroundings, sensing means configured to gather sensor data, and means for causing the display means to show a visual element including a video. The head-mounted display system further includes means for detecting a triggering event using a set of sensor data from the sensing means, and means for changing a visibility of the video shown with the display means, based on the triggering event, while the video continues to be shown.

An example head-mounted display device, according to the description, includes a body configured to be worn on a user's head, and a display, coupled with the body and configured to allow the user to view the user's surroundings and a visual element shown with the display. The head-mounted display device further includes at least one sensor configured to provide sensor data, and a processing unit communicatively coupled to the display and the at least one sensor. The processing unit is configured to cause the display to show the visual element, the visual element including a video, detect a triggering event using a first set of sensor data from the at least one sensor, and cause the display to change a visibility of the video shown with the display, based on the triggering event, while the video continues to be shown.

An example non-transitory computer-readable medium, according to the disclosure, has instructions embedded thereon for providing a reactive video playback interface for a head-mounted display. The instructions include computer-executable code for causing a display of the head-mounted display to show at least one visual element including a video. The display is at least semi-transparent from a view of a user of the head-mounted display when no content is displayed. The instructions further include computer-executable code for detecting a triggering event using a first set of sensor data from one or more sensors, and changing a visibility of the video based on the triggering event while the video continues to be shown.

An example method for use with an HMD, according to the description, includes displaying one or more features, detecting motion of the HMD, and altering the displaying of the features in response to the detected motion. The altering can increase a visibility of objects external to the HMD from the perspective of a user of the HMD. In some embodiments, altering the displaying of the features may include one or more of increasing the transparency of at least one of the one or more features, reducing the size of at least one of the one or more features, or removing at least one of the one or more features from a display.

Another example method, according to the disclosure, includes detecting a context with respect to a user of a heads-up display, causing the heads-up display to display one or more features based at least in part on the detected context, detecting a triggering event, and causing the display of the one or more features to be altered based at least in part on the detected triggering event.

The method can include one or more of the following features. The context can include an activity of the user. The context can be detected using one or more sensors. The one or more sensors can include at least one of a motion sensor, an inertial sensor, a light sensor, a microphone, or an antenna. The one or more sensors can be attached to the heads-up display.

Yet another example method for use with an HMD, according to the disclosure, can include displaying one or more features to a user of the HMD, detecting a motion of the user's head, and increasing a transparency of at least one of the one or more features in response to the detected motion.

A further example method for use with an HMD, according to the disclosure, includes detecting a user of the HMD is sitting down, displaying one or more features, detecting that the user is standing up, and reducing the size of at least one of the one or more features in response to the detecting that the user is standing up.

Other functions and features are contemplated. For example, an example method can include causing one or more elements to be presented by a head mounted display at a first level, detecting a movement of the head mounted display, determining an adjustment amount based on a magnitude or amount of the detected movement, and causing the first level to be adjusted based on the determined adjustment amount.

This example method can include one or more of the following features. Determining the adjustment amount can include selecting an amount from a plurality of amounts based on the magnitude or amount of determined movement. Causing the first level to be adjusted can include causing a gradual or tiered adjustment. An adjustment amount can be determined so as to be approximately proportional to the magnitude or amount of determined movement, up to a threshold. Causing the first level to be adjusted may not include ceasing the presentation of the one or more elements. The one or more elements presented can be audio elements, and causing the first level to be adjusted can include reducing a volume at which the audio is presented. The one or more elements presented can be displayed visual elements, and causing the first level to be adjusted can include increasing transparency of the displayed visual elements. The one or more elements presented can be displayed visual elements, and causing the first level to be adjusted can include reducing a size of the displayed visual elements. The displayed visual elements can include a portion of a video. The displayed visual elements comprise a navigation interface. The displayed visual elements comprise textual information, a message center, rich text and/or images, figures, data, stock information, scientific data, or sporting content or scores.

Additionally or alternatively, the example method can include one or more of the following features. The method may also include determining that the head mounted display has returned to a state at which the head mounted display was before the movement and causing the one or more elements to be presented at the first level based on the determining that the head mounted display has returned to the state. The method can include pausing playback of at least one of the one or more elements based on the detecting, and resuming playback of the at least one element based on determining that the head mounted display has returned to a state at which the head mounted display was before the movement. The detecting can include detecting movement in addition to a substantially constant acceleration, detecting a rotation of the head mounted display, and/or ignoring linear acceleration of the head mounted display. The method may also include causing one or more additional elements to be presented based on the detected movement.

Items and/or techniques described herein may provide one or more of the following capabilities, as well as other capabilities not mentioned. Techniques can provide for automatically changing the visibility or form of user interface elements, such as a video, to help allow the user to see his or her environment based on environmental conditions and/or user movement, without necessarily requiring users to provide commands through a user interface. This can be particularly helpful in urgent situations, where it could be burdensome and/or dangerous for the user to provide commands through a user interface, or wherein the user may not otherwise realize that the situation is urgent or dangerous. These and other embodiments, along with many of its advantages and features, are described in more detail in conjunction with the text below and the attached figures.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
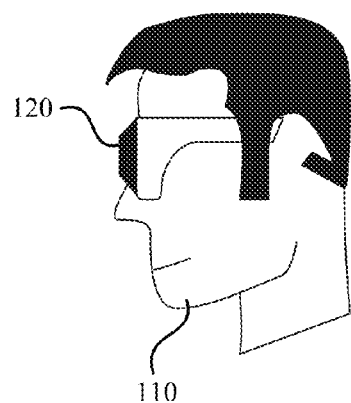
FIGS. 1A-1B are simplified illustrations of embodiments of a head-mounted display (HMD).

The following description is provided with reference to the drawings, where like reference numerals are used to refer to like elements throughout. While various details of one or more techniques are described herein, other techniques are also possible. In some instances, structures and devices are shown in block diagram form in order to facilitate describing various techniques.

Embodiments of the present invention are directed toward a reactive user interface for a head-mounted display (HMD). HMDs are devices that can display information to a user wearing the device. Furthermore, because these devices are worn on a user's head, HMDs can have capabilities that are unachievable in other displays. For example, certain HMD's may have a transparent (or semi-transparent) display enabling user to view both the user's surroundings as well as visual elements on the display. The visual elements themselves may have a degree of transparency, which may be determined by an application executed by the HMD. Some embodiments can provide "augmented reality" functionality by overlaying physical objects viewed by a user with visual elements (such as text and/or pictures) associated with the physical objects. Embodiments of the present invention allow for the HMD to intelligently react to sensor and other input to adjust what is shown on the display. Specifically, HMDs can be configured to interpret sensor data to build a "situational awareness" that enables the HMD to determine a context (e.g., an activity and/or situation in which the user is engaged) and control information shown with the HMD's display accordingly. Not only may this functionality be helpful to the HMD user, but it may also increase the user's safety by, for example, allowing user to see and/or hear what is going on around them in certain contexts and/or based on certain movements, and/or drawing the user's attention away from media or other elements presented by the HMD.

FIG. 1A is a simplified illustration of one embodiment of an HMD 120 worn on the head of a user 110. This embodiment includes a body or frame, similar to a pair of glasses, which can rest on the nose and ears of a user. Portions of the display of the HMD 120 can be positioned in front of a user's eyes like lenses of a pair of eyeglasses. At least a portion of the display can be transparent, enabling the user 110 to see both the user's surroundings and visual elements shown with the display. The level of transparency of the visual elements shown on the display may vary, depending on the desired functionality of the displays 220, settings of a graphical user interface (GUI) shown with the display, and/or a software application executed by the HMD 120 (e.g., a video, a map, an Internet browser, etc.). Although FIG. 1A shows an embodiment of an HMD 120 with an eyeglasses-like frame, other embodiments can have different form factors and/or utilize different optical technologies (e.g., a retinal projector, contact lens, or other optical system) that can offer similar functionality. Furthermore, the HMD 120 may include other interfaces such as speakers (which can include headphones), a camera, a touchpad, buttons, and the like to interact with the user 110. Components of a computer system that can be integrated into and/or communicatively coupled with an HMD are described in further detail below with regard to FIG. 9.

Figure 1B:
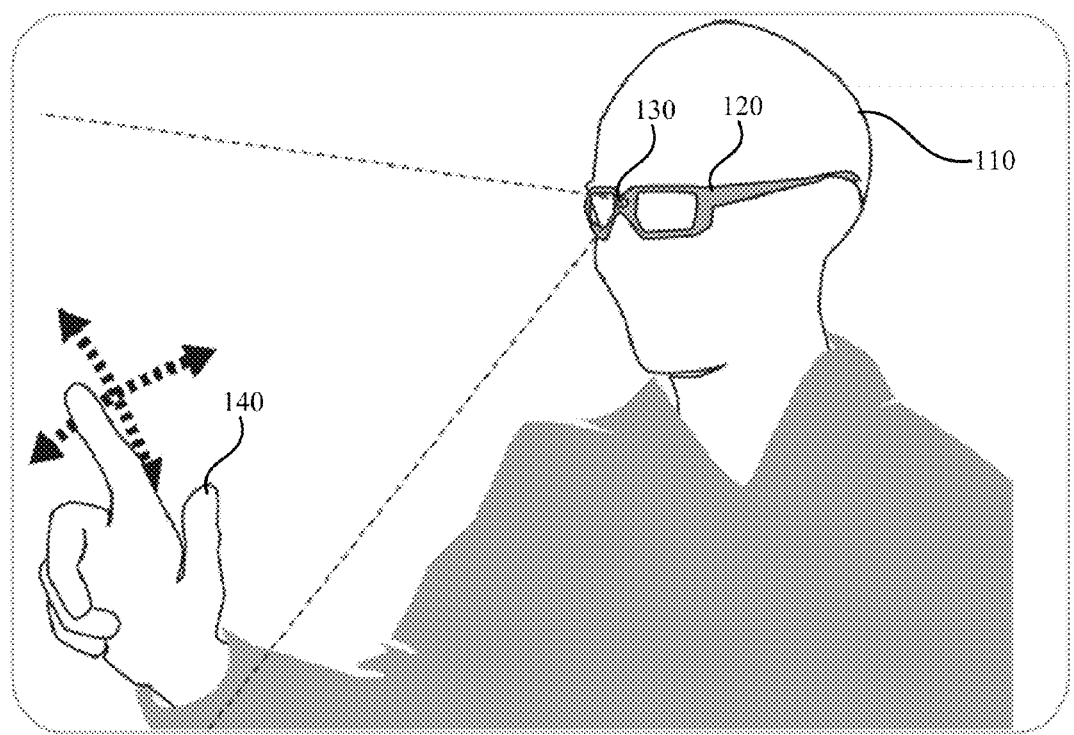

HMDs 120 further can be configured with a variety of sensors for additional functionality. FIG. 1B is a simplified illustration of an embodiment of an HMD 120 including an outward-facing camera 130 and/or other sensor(s), which can be used to track an object, such as a user's hand 140, for user interaction with a GUI of the HMD 120. Additionally or alternatively, the HMD 120 can include one or more sensors such as Satellite Positioning System (SPS) receivers, accelerometers, gyroscopes, magnetometers, altimeters, infrared proximity detectors, photodiodes, microphones, and/or other sensor(s) to be able to detect location, motion, orientation, light, sound, and the like. Embodiments may incorporate such sensors by embedding and/or otherwise physically coupling the sensors to the HMD 120. Additionally or alternatively, sensors may be separate from the HMD 120, communicatively coupled via a wireless data connection, for example. These sensors can be used to help the HMD 120 determine an activity in which the user 110 is engaged using software and/or hardware means such as, for example, the computer system of FIG. 9, which can be integrated into and/or communicatively coupled with the HMD 120. This "situational awareness" can enable the HMD 120 to manipulate the GUI in an intelligent manner, based on the user's situation. FIGS. 2-6 illustrate examples of such functionality.

Figure 2:
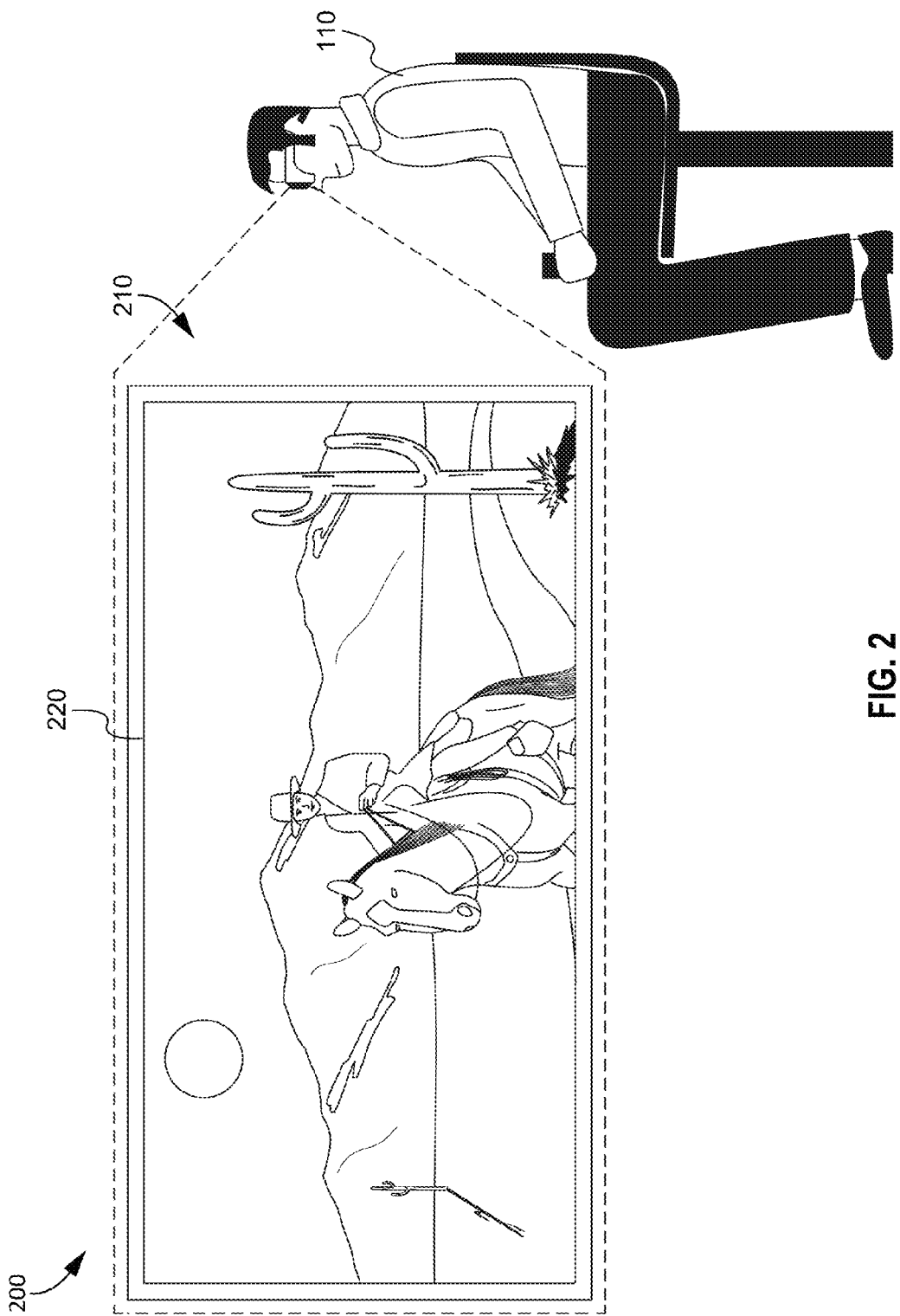
FIGS. 2-6 are simplified illustrations showing examples of how an HMD can be configured to react in an intelligent manner, based on the user's situation.

FIG. 2 is an illustration 200 showing an embodiment of what a user 110 can see during playback of a movie by an HMD 120, while seated. In this example, the HMD 120 utilizes sensor data to determine that the user is seated and/or still, and shows the movie in a large window 220 within the display 210, with little or no transparency. In other words, because the HMD 120 has determined that the user is seated (e.g., sitting at home, on a bus, in a park, etc.) and able to focus on the movie, the HMD 120 can show the movie in a window 220 that occupies all (or nearly all) of the display 210 area with little or no transparency because the user may not need or want to be able to see surrounding objects.

Various sensors can be utilized in a determination that a user is seated. As discussed above, one or more SPS receivers, accelerometers, gyroscopes, magnetometers, altimeters, and/or other sensors may be used to detect location, motion, orientation, light, sound, and the like. As an example, the HMD 120 may utilize accelerometer and/or SPS input to track movement and/or location over time, determining that a user is seated if the input indicates that the HMD 120 is in an upright orientation with little movement and little or no change in location. In another example, the HMD 120 may detect lateral velocity over a threshold amount using SPS data, but little or no vertical movement that would be indicative of walking or running. In this case, the HMD 120 may conclude that the user is sitting down in a vehicle. In this latter case, the HMD 120 can prompt the user to confirm that the user is in a vehicle, and (optionally) the user is not driving the vehicle. Those of skill in the art will appreciate that other sensors and/or other sensor data may be used to determine that a user is seated.

Figure 3:
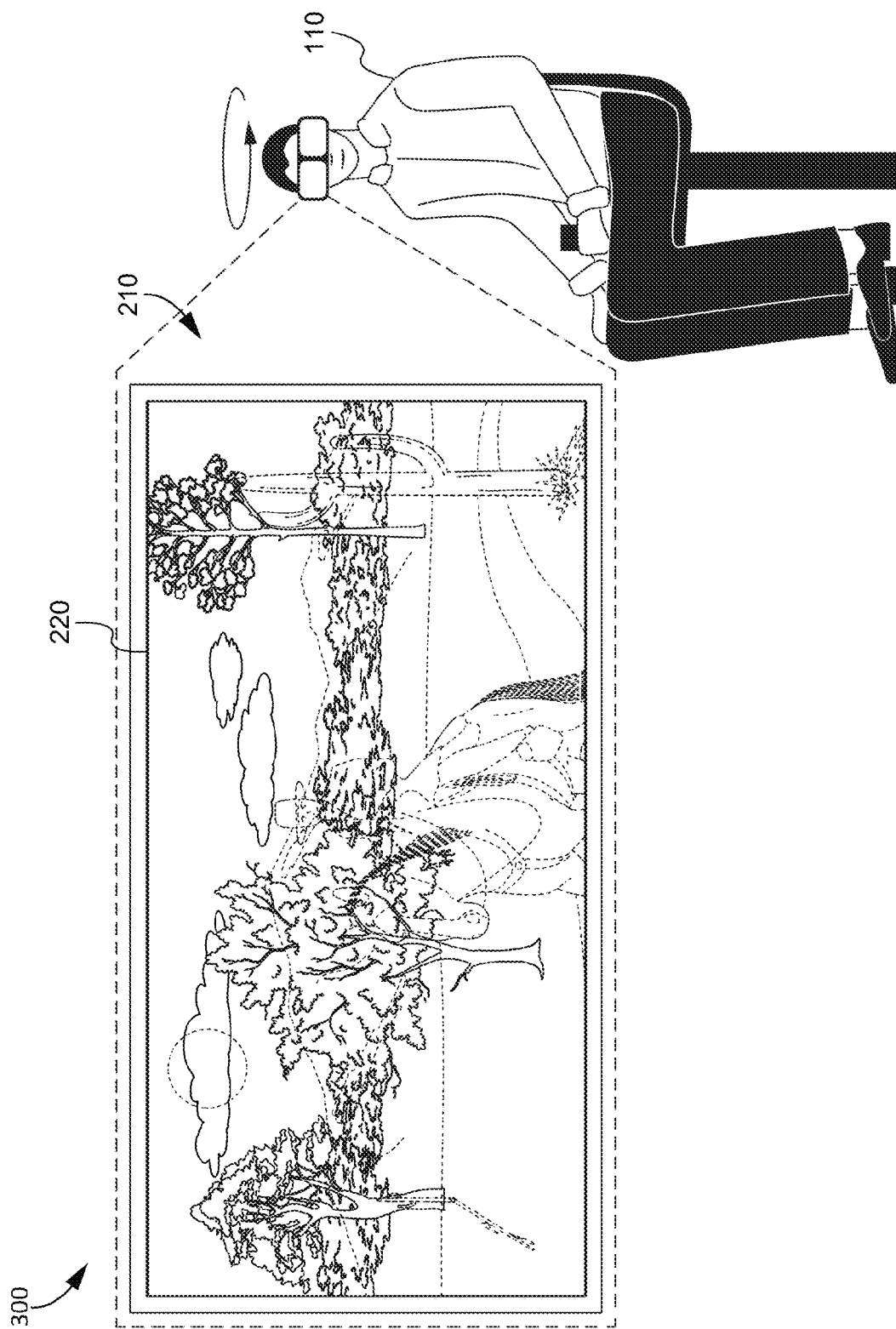

FIG. 3 is an illustration 300 that shows an example of how the HMD 120 may manipulate the displayed visual elements to respond to a movement and/or a first type of triggering event. Here, the HMD 120 uses sensor data to detect a rapid movement of the user's head and/or body and reacts by changing the visibility of the video, making the window 220 in which the movie is displayed (and/or other visual elements shown by the display 210) become more transparent. This enables the user to see the user's surroundings through the display. In the embodiment shown in FIG. 3, the transparency is increased, resulting in a 50-75% reduction in the movie's opacity. In other embodiments, the opacity may be greater or less than this range, depending on desired functionality. Furthermore, the change in the level of transparency may be proportional to the speed and/or range (e.g., amount) of the user's movement (e.g., transparency may increase with increased movement and/or speed of movement). In some embodiments, transparency adjustments may be gradual or tiered. Moreover, some embodiments may cause the movie window 220 to become transparent when a user moves with greater than a threshold amount of range and/or speed. Thus, the HMD 120 may not change the visibility of the video if only small and/or slow movements are detected, to help reduce unintended interruption in playback. In some embodiments, a first movement, such as a sharp turn of the user's head to the side, may reduce the visibility a first amount, and a second movement, such as the user standing up, may further reduce the visibility or cause the video to close. In some embodiments, only certain movements, such as head turning (e.g., side to side), tilting (e.g., up and down), and/or vertical movement (e.g., standing, sitting, etc.) may trigger changes in the visibility of the movie window 220 and/or other displayed elements. Other movements, such as linear horizontal acceleration or a base level of acceleration can be ignored, for example when a user is riding a bus or train. Thus, the HMD 120 may not adjust the visibility of the movie window or alter playback in any other way if only forward or backward motion is detected. In some embodiments, detected acceleration may trigger manipulation of visual elements, such that playback of a movie is uninterrupted while moving at an approximately constant speed, but detection of an acceleration (change in speed) above a certain threshold may cause the HMD 120 to manipulate playback as described above. Depending on desired functionality, the HMD 120 can also cause the volume of the movie's audio to be reduced in a similar manner. The methods of changing transparency of a movie window 220 described herein can also apply to different methods of changing the visibility (e.g., reducing a window size) and/or different visual elements.

Depending on functionality, the HMD 120 may restore visibility of the window 220 (and/or other visual elements) by determining a subsequent triggering event, such as a movement, passage of time, gesture, etc. For example, if no subsequent rapid movements (or other triggering events) are detected, the HMD 120 can return the movie window 220 to its original level of transparency and original audio volume. This return can be sudden or gradual and may occur after a threshold amount of time. In some embodiments, the threshold amount of time may be 1, 2, 3, 4, or 5 seconds. In some embodiments, the threshold amount of time may be some other amount. Depending on desired functionality, the threshold amount of time may be user selectable. Additionally or alternatively, the HMD 120 may restore visibility of the window 220 (and/or other visual elements) based on input received by the user (e.g., voice command, gesture, head movement, button, etc.).

Accelerometers, magnetometers, and/or gyroscopes in the HMD 120 can be used to detect a rapid movement of the user's head and/or body, sensing, for example, the rotation of the HMD 120 around a central axis (e.g., a turning of the user's head). As indicated previously, a threshold speed and/or range may be used to determine whether or not a triggering event has occurred, such as a detected turn of greater than a certain amount (e.g., 10, 20, 30, 40, or 50 degrees, etc.) in less than a certain amount of time (e.g., 0.25, 0.5, 1, 2, or 3 seconds, etc.) and/or at or above a certain rate (e.g., 10, 20, 30, 40, or 50 degrees per second, etc.). Additionally or alternatively, other sensor data can be utilized to determine other types of head movement and/or other triggering events.

Figure 4:
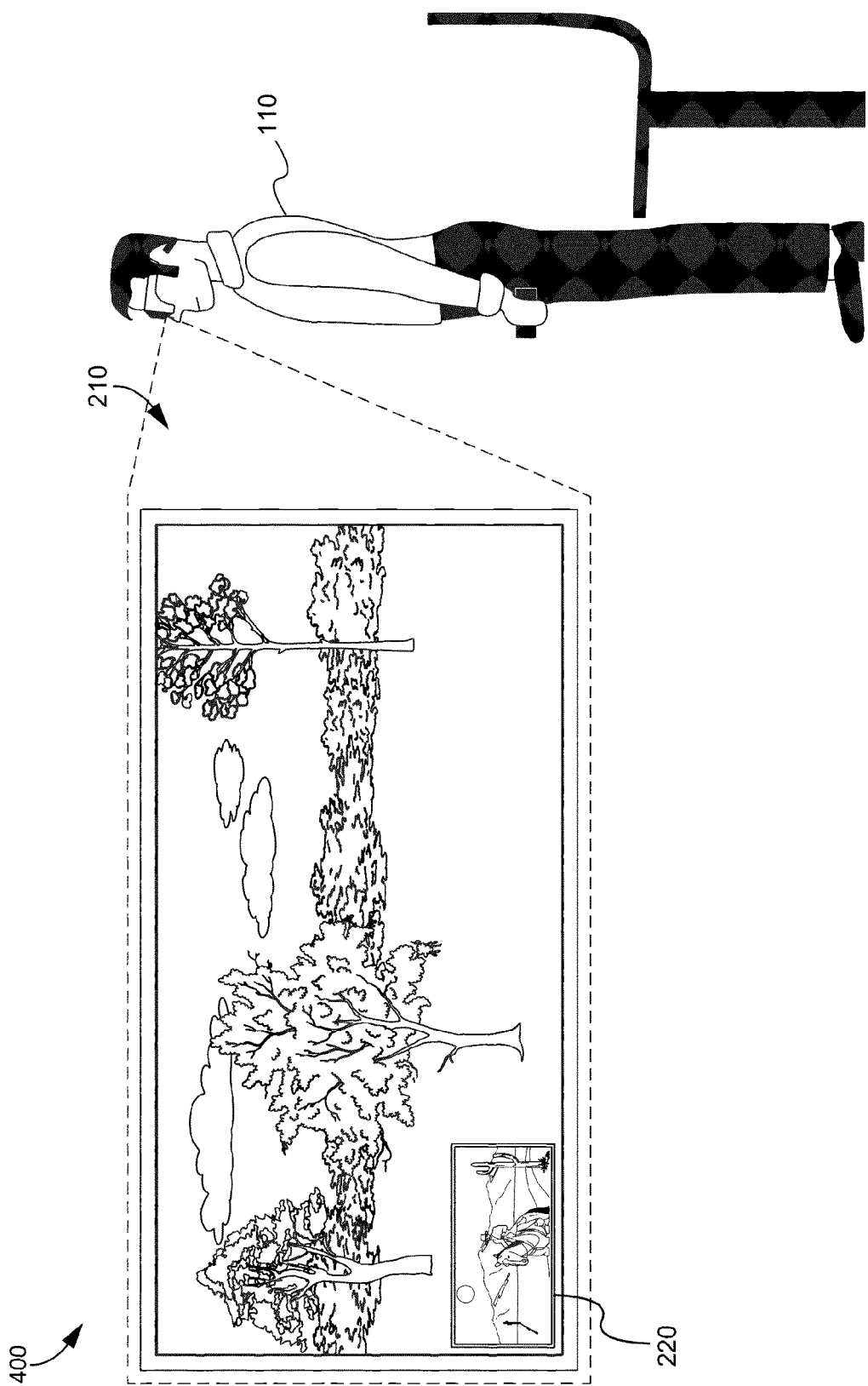

FIG. 4 is an illustration 400 of how the HMD 120 may manipulate the GUI to respond to standing and/or a second type of triggering event. Here, the HMD 120 senses that a user has stood up from a seated position, which can indicate that a user may need to see the user's surroundings. Accordingly, the HMD can change the visibility of the window 220 in which the movie is shown, for example by reducing its size. In the example shown in FIG. 4, the size of the movie window 220 is reduced to less than 33% of the width of the user's field of view (or less than 33% of the width of the display 210). Other embodiments can reduce the movie window 220 differently (e.g., less than 40, 50, 60%, etc. of the width of the display 210). Moreover, depending on desired functionality, the HMD 120 may also alter playback by causing the movie window 220 to become partially transparent, pausing playback, reducing the volume of the audio, and the like. The movie window 220 can be restored to its original size (and other aspects of movie playback, if changed, can also be restored) after a subsequent triggering event occurs, such as described above in relation to FIG. 3. Here, the HMD 120 may detect the user 110 sitting down again, which could be interpreted as such a subsequent triggering event.

Various sensors can be utilized in a determination that the user has stood up from a seated position. In one example, if an HMD 120 has determined that the user is seated, then subsequently receives sensor data (from, e.g., an accelerometer and/or gyroscope) indicating an upward movement greater than a threshold amount (e.g., 0.5, 1, 2, or 3 feet, etc.) and within a certain period of time (e.g., 0.5, 1, 2, or 3 seconds, etc.) the HMD 120 may determine that the user has stood up. Additionally or alternatively, other sensor data may be utilized, depending on desired functionality.

Figure 5:
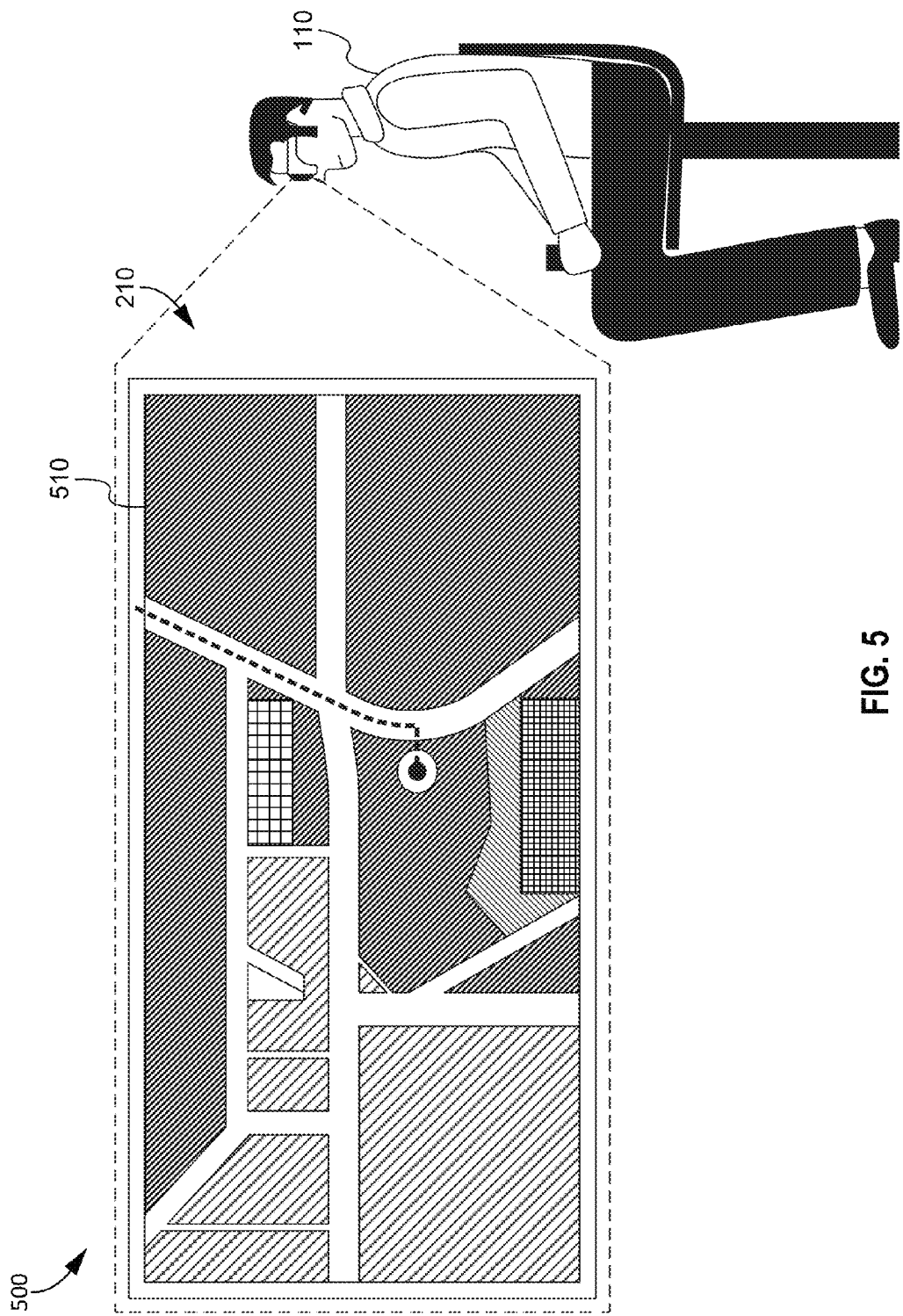
Figure 6:
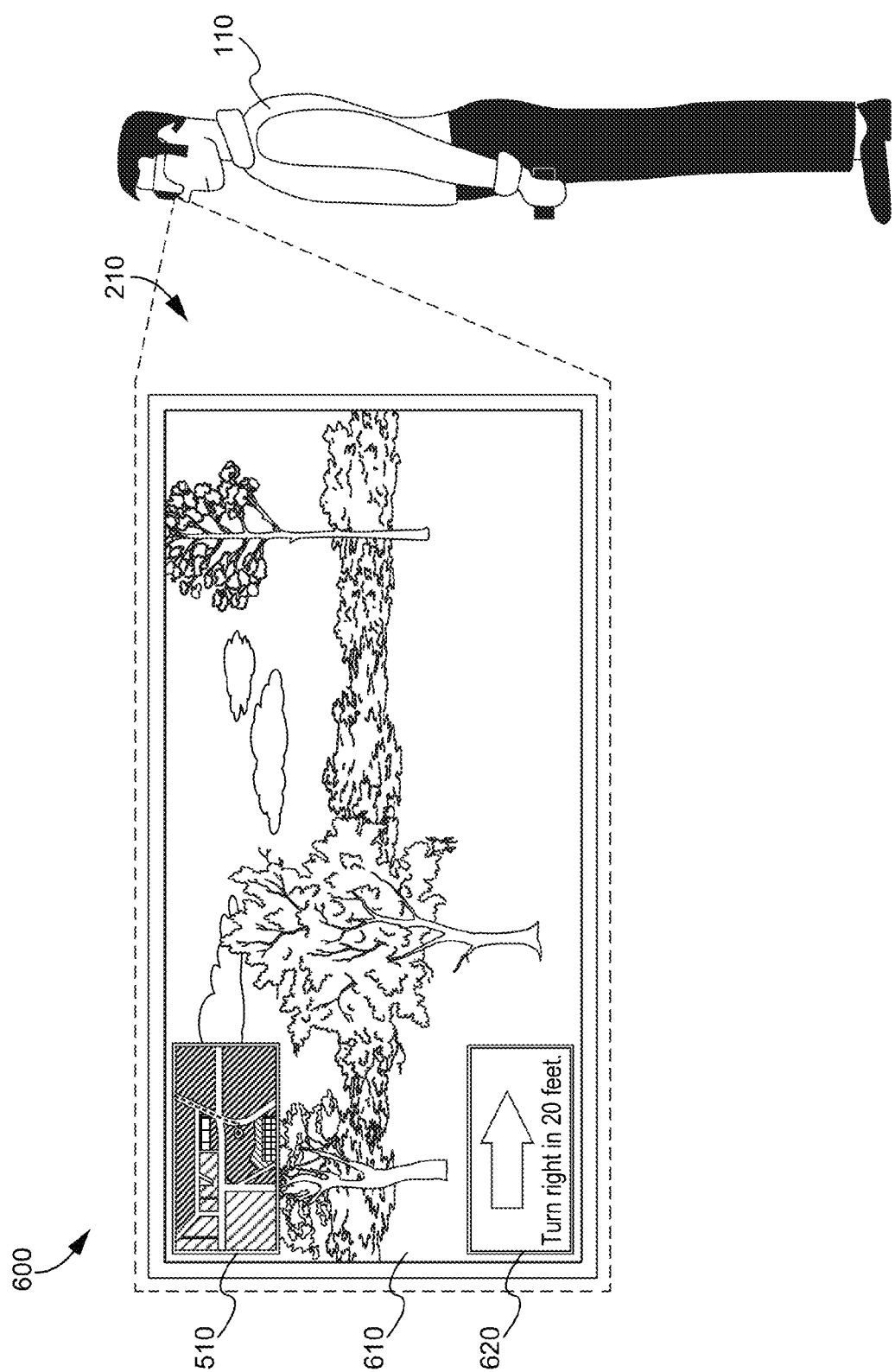

FIGS. 5-6 illustrate how the HMD 120 may manipulate the GUI differently, based on the software application executed by the HMD 120. FIG. 5, for example, is an illustration 500 of how the HMD 120 can execute a journey planning software application in which the GUI provides a map 510 that occupies nearly all of the display 210 while the user 110 is seated. The user can provide input to the journey planning application via hand gestures, a touchpad, audio commands, and/or other means, depending on desired functionality. FIG. 6 is an illustration 600 of how the HMD 120 may manipulate the GUI after detecting that the user has stood up from a sitting position. Here, the map 510 has been reduced in size, allowing the user to see the user's surroundings 610 through the display 210. The display 210 also provides another window 620 that shows navigation instructions of the journey planning application. The embodiment shown in FIG. 6 illustrates the map 510 and other window 620 as being less than 33% of the width of the user's field of view (or less than 33% of the width of the display 210), but other embodiments can reduce the map 510 and/or other window 620 differently (e.g., less than 40, 50, 60%, etc. of the width of the display 210).

The illustrations provided in FIGS. 2-6 are examples only, and are not limiting. Embodiments of HMDs 120 can use sensor data to create a situational, or contextual, awareness, which can enable the HMDs 120 to take any of a variety of graduated responses based on various triggers. Triggers can include, for example, any combination of a certain movement of the user, a proximity of an object to the user, a proximity to a specific person to the user, entry of the user into a vehicle, exit of the user from a vehicle, transitions between states of movement of a user (e.g., still, walking, running states, and the like), a loud noise, arrival of the user at a certain location, and the like. Specific movements of a user can include a turning of the user's head, the user standing up, the user sitting down, the user falling down, and the like. In some embodiments, a trigger may include the approach or arrival of another person or object. For example, the trigger may comprise the approach of a friend of the user or the arrival of a train or bus that the user is waiting for. In some embodiments, these triggers may be detected using a sensor such as a motion sensor or a light sensor. In some embodiments, these triggers may be determined or inferred based on received data. For example, the approach may be inferred based on detecting a signal, such as an NFC or Bluetooth signal for example, from a device of the approaching entity. As another example, a transit system may send messages to registered users or devices having an application provided by the transit system that a bus or train, for example, is arriving. Furthermore, some triggering events may comprise a recognized pattern of events or triggers. For example, if a user transitions from walking to sitting to moving at car speeds, it can be determined that user may be in a vehicle, which could be an event that triggers a certain response of the HMD.

Reponses can vary, which may or may not depend on a software application executed by the HMD 120. For example, an application may have several different "modes" that are used, based on different triggers. For example, a minimized or closed mode may cause the application to remove one or more visual elements from the display 210. A reduced mode may cause the application to reduce the size of one or more visual elements on the display. A transparent mode may cause the application to increase the transparency of one or more visual elements on the display. Media playback applications may also include a paused mode in which media playback is paused. These different modes may be activated upon the detection of different triggering events. An HMD 120 may also close or minimize an application and/or execute another application based on a triggering event. In one embodiment, the HMD 120 may be configured to implement an opaque mode in which a display of the HMD 120 displays all black or otherwise appears opaque to a user of the HMD 120, for example while the user is sleeping. When a triggering event is detected, such as when the user sits up or exits REM sleep or another individual approaches, for example, the HMD 120 may display a feature that is at least partially transparent to the user or may cease displaying.

In some embodiments, an HMD 120 may also detect extreme events that trigger certain response—which may be independent of the type of application executed by the HMD 120 (e.g., movie playback, journey planning, Internet browser, etc.). Detecting a loud noise, that the user has fallen down, and/or receiving a transmission signal indicating an alert or emergency are just some examples. The HMD 120 can respond by closing down a currently-executed program and/or evoking another application, such as a telephone (or other application) to contact emergency services, an application to show the alert on the display 210, and the like.

Figure 7:
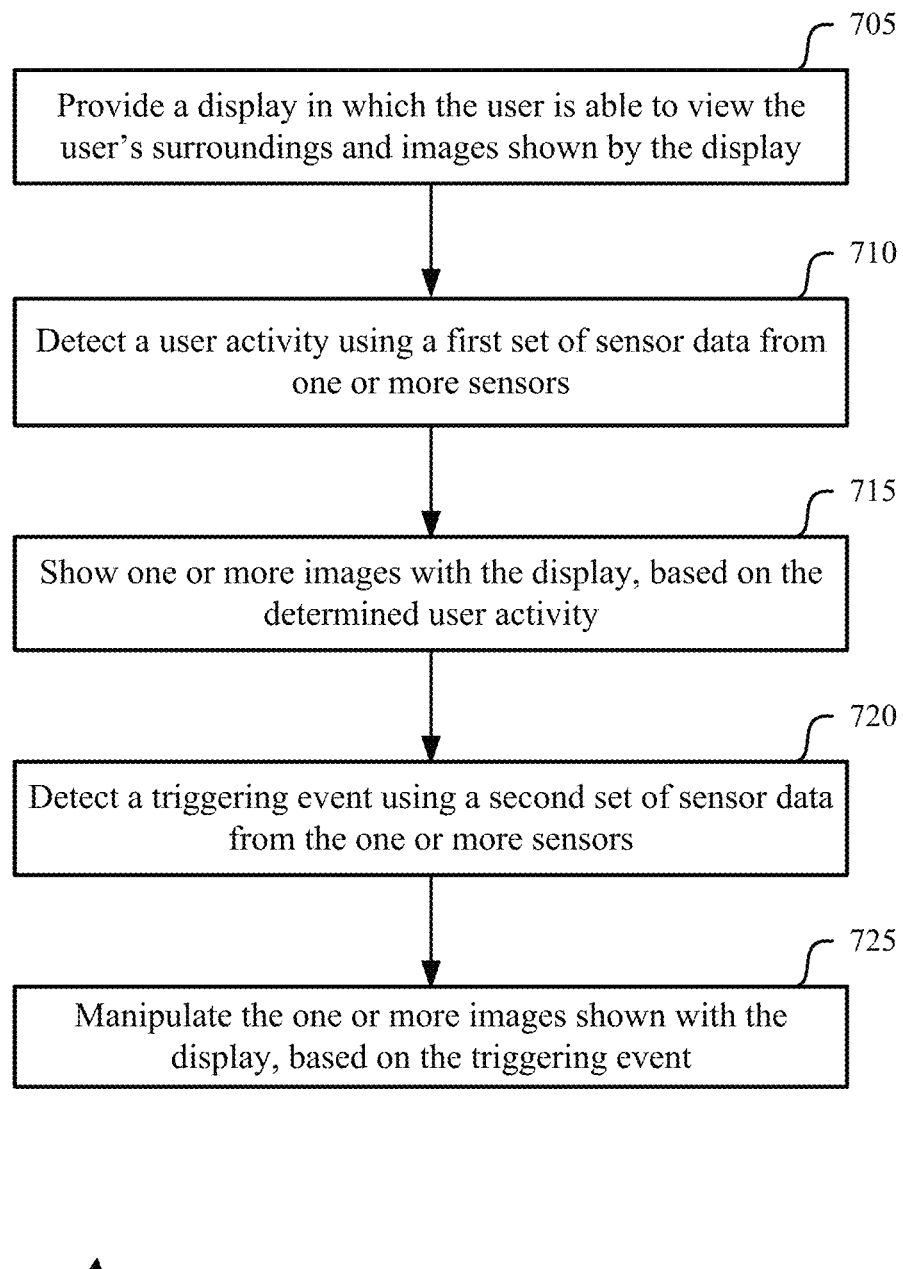
FIG. 7 is a flow diagram illustrating of a method of enabling user interaction with an HMD, according to one embodiment.

FIG. 7 is a flow diagram illustrating an embodiment of a method 700 of enabling user interaction with a head-mounted display. At block 705, a display area is provided in which the user is able to view the user's surroundings and visual elements shown by the display. In some embodiments, such as those utilizing a retinal projector, the display area can be an area within the field of view of a user that may not necessarily correspond to a physical display or screen. Means for performing the functionality of 705 can include output devices 920 (e.g., a display) of the computer system 900 of FIG. 9.

At block 710, a user activity is detected using a first set of sensor data form one or more sensors. As indicated above, sensor data can be collected from a wide variety of sensors. For example, sensors can include inertial sensors, light sensors, motion sensors, microphones, antennas, and the like. This sensor data can be analyzed to determine a user activity such as moving, lying down, sitting down, standing up, walking, running, driving a car, riding a bus, and the like. Detecting the user activity may be performed, for example, by a processing unit, memory, and/or other computing means such as the processor(s) 910, output device(s) 920 (e.g., a display), input device(s) 915 (e.g., sensors), and/or working memory 935 (including software) of the computer system 900 of FIG. 9, which can be incorporated into and/or communicatively coupled with the HMD. Sensors also can be communicatively coupled to and/or integrated into the HMD.

At block 715, one or more visual elements is shown with the display, based on the determined activity. As indicated in examples above, visual elements can be large, reduced in sized, transparent, and the like, based on a determined activity. Means for showing the one or more visual elements can include a display communicatively coupled with a processing unit, memory, and/or other computing means, such as the processor(s) 910, output device(s) 920 (e.g., a display), and/or working memory 935 (including software) of the computer system 900 of FIG. 9.

At block 720, the method 700 includes detecting a triggering event using a second set of sensor data from the one or more sensors. Such triggering events can include a variety of events, as indicated above, such as user movements and activities, received alerts, and more. Here again, means for detecting the triggering event can include a processing unit, memory, and/or other computing means communicatively coupled with the one or more sensors. This can include, for example, the processor(s) 910, input device(s) 915 (e.g., sensors), and/or working memory 935 (including software) of the computer system 900 of FIG. 9.

At block 725, the one or more visual elements shown with the display is manipulated, based on the triggering event detected at block 720. Manipulation can involve any of a variety of GUI changes, as discussed herein above, such as removing and/or adding visual elements (e.g., windows), changing the transparency of an visual element, reducing an visual element's size, and more. Here again, means for manipulating the one or more visual elements can include a processing unit, memory, and/or other computing means coupled to the display, such as the processor(s) 910, output device(s) 920 (e.g., a display), and/or working memory 935 (including software) of the computer system 900 of FIG. 9.

Figure 8:
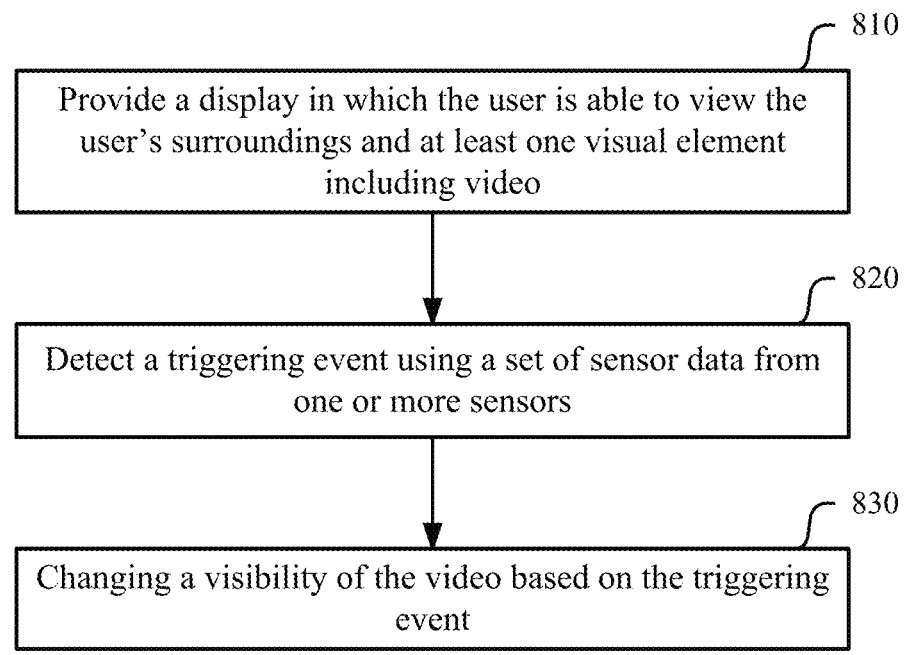
FIG. 8 is a flow diagram illustrating a method for providing an implementation of a reactive user interface for an HMD as applied to video playback.

FIG. 8 is a flow diagram illustrating a method 800 providing a particular implementation of a reactive user interface for an HMD as applied to video playback. At block 805, a display area is provided in which the user is able to view the user's surroundings and at least one visual element including video shown by the display. As such, the display can be a transparent display of an HMD as described herein. That said, the method 800 can also apply to HMDs that may not have transparent displays, but may instead provide, for example, live video images of the user's surroundings (in addition to the video being played back).

At block 820, the method 800 includes detecting a triggering event using a second set of sensor data from the one or more sensors. Such triggering events can include a variety of events, as indicated above, such as user movements and activities, received alerts, and more. Here again, means for detecting the triggering event can include a processing unit, memory, and/or other computing means communicatively coupled with the one or more sensors. This can include, for example, the processor(s) 910, input device(s) 915 (e.g., sensors), and/or working memory 935 (including software) of the computer system 900 of FIG. 9, described below.

At block 830, a visibility of the video is changed, based on the triggering event. Changing the visibility of the video can allow the user to see the user's surroundings more clearly. Accordingly, changing the visibility of the video can include increasing the transparency of the video, removing the video from the display, reducing the size of the video, and the like. Some embodiments and/or triggering events may provide for reducing the visibility while the video continues to be shown (e.g., showing video playback or a paused image of the video in a transparent and/or reduced-size window without removing the video from the display). Additionally or alternatively, the HMD may pause the video, reduce and/or mute the audio, display at least one additional visual element (e.g., a message, incoming call notification, emergency warning, etc.). Here again, means for manipulating the one or more visual elements can include a processing unit, memory, and/or other computing means coupled to the display. For example, means can include the processor(s) 910, output device(s) 920 (e.g., a display), and/or working memory 935 (including software) of the computer system 900 of FIG. 9.

It should be appreciated that the specific steps illustrated in FIGS. 7 and 8 provide an example of methods 700, 800 of providing a reactive interface for an HMD. Alternative embodiments may include alterations to the embodiments shown. For example, alternative embodiments may include incorporating graduated responses based on the length and/or magnitude of a triggering event. A graduated response could include, for example, increasing the amount of transparency of a movie and/or visual elements shown by a GUI as the range of a detected motion increases, such that a detected movement (e.g., head turn) of 60 degrees will result in higher transparency than a similar detected movement of 30 degrees. Additional features may be added, removed, or combined depending on the particular applications. One of ordinary skill in the art would recognize many variations, modifications, and alternatives.

As indicated previously, implementations may also involve contextual determinations based on sensor and/or other data, which may be used, in addition or as an alternative to sensor data, as a basis for changing the visibility and/or otherwise modifying visual elements shown by an HMD. As illustrated previously, contextual determinations can indicate an activity the user is engaged in, a location in which the user is disposed, and more, which can allow the HMD to detect triggering events that are more complex than those based on raw sensor data alone. As such, triggering events can include more than certain movements, but also the proximity of an object or specific person to the user, a user's entry into and/or exit from a vehicle, and the like. Moreover, the HMD may respond to certain movements differently in different contexts. For example, if a user lays down in bed, visual elements may not need to be altered (e.g., a video can continue playback without any changes to visibility), whereas if the same movement is detected while a user is on a bus or outside, it could mean that the user has fallen, in which case the HMD could reduce or remove visual elements to allow the user to see his or her surroundings.

Figure 9:
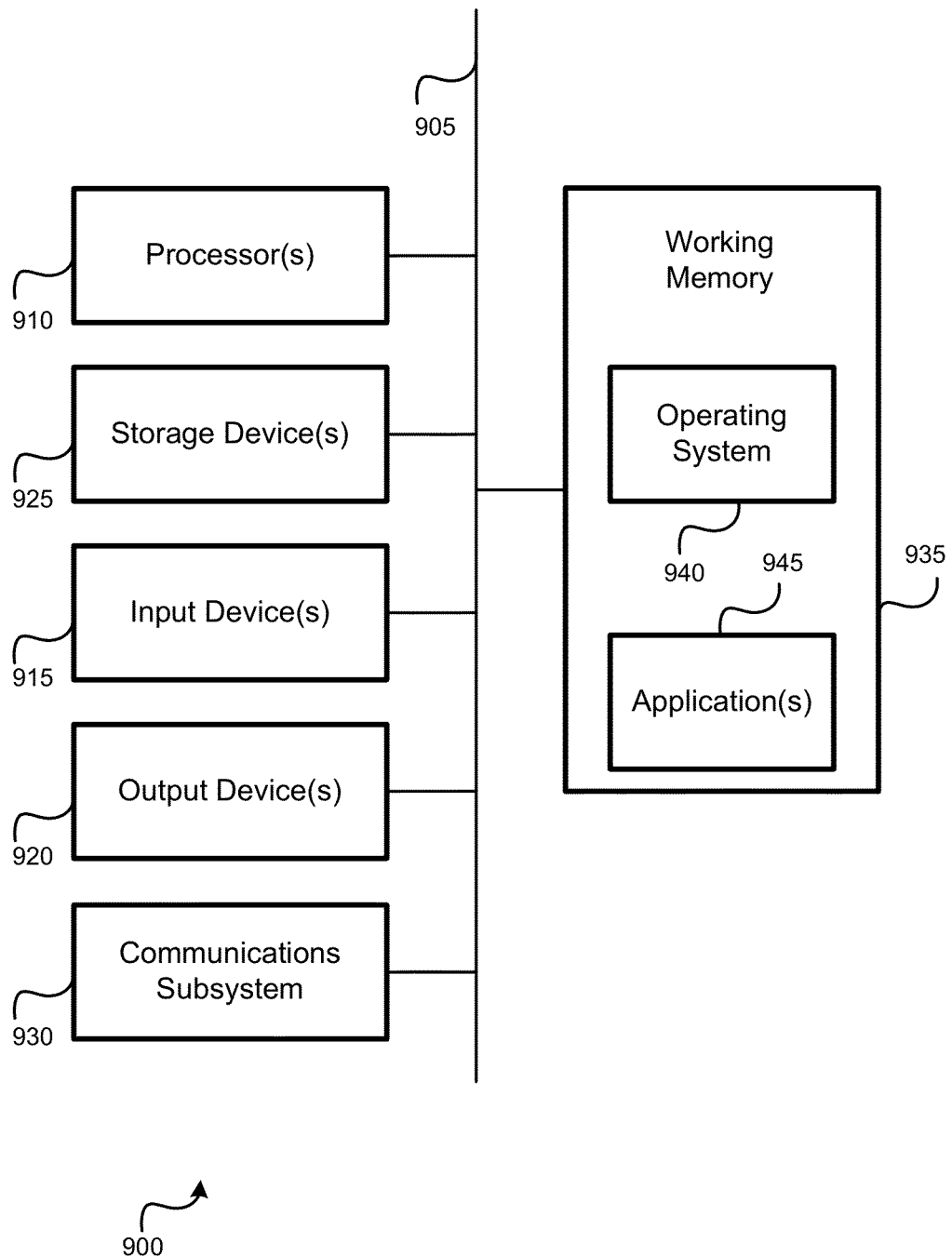
FIG. 9 is a simplified block diagram of an embodiment of a computer system that can be incorporated into and/or communicatively coupled with an HMD.

FIG. 9 illustrates an embodiment of a computer system 900, which may be incorporated into and/or communicatively coupled with an HMD. One or more components of the computing system 900 could be shared between different devices, such as an HMD, smart phone, tablet, personal computer, or other computing device. In some embodiments, software and other applications could be run on a separate device communicatively linked to the display. In other embodiments, an HMD may have some or all of the computer system 900 integrated therewith.

FIG. 9 provides a schematic illustration of one embodiment of a computer system 900 that can perform the methods provided by various other embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include a processing unit, such as processor(s) 910, which can include without limitation one or more general-purpose processors, one or more special-purpose processors (such as digital signal processing chips, graphics acceleration processors, and/or the like), and/or other processing means, which, as stated above, can be utilized to perform various steps, such as those described in relation to FIGS. 7 and 8. Hardware elements may also include one or more input devices 915, which can include without limitation SPS, accelerometers, and/or other sensor(s) to be able to detect location, motion, orientation, light, sound, and the like, which can be utilized as means for gathering sensor data. Moreover, sensors may be utilized, together with the processor(s) 910, as means for detecting user activity and/or a triggering event, as described herein. Other devices such as a touch pad, keyboard, microphone, and/or the like may also be included. One or more output devices 920 are also included. These output devices can include one or more displays and/or other display means, as well as audio means (e.g. speakers) and/or other devices, which may be utilized to perform one or more steps as described in relation to FIGS. 7 and 8. For example, when the system 1000 is implemented in an HMD, the output device 1020 may include a transparent or semi-transparent display. In embodiments where the device 1000 is implemented in a phone or other device controlling the HMD, the output device 1020 may comprise a touchscreen or may be omitted.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, an 902.11 device, a WiFi device, a WiMax device, cellular communication facilities, etc.), and/or the like. The communications subsystem 930 may include one or more input and/or output communication interfaces to permit data to be exchanged with a network, other computer systems, and/or any other electrical devices/peripherals. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application(s) 945, which may comprise computer programs provided by various embodiments, and/or may be designed to implement methods, and/or configure systems, provided by other embodiments, as described herein. Merely by way of example, a portion of one or more procedures described with respect to the method(s) discussed above, such as the methods 700 and 800 described in relation to FIGS. 7 and 8, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Further, although embodiments are described herein with respect to an HMD, those of skill in the art will appreciate that other forms of head-mounted displays may be utilized. For example, embodiments described herein may be implemented with respect to one or more contact lenses that a user may wear and/or may be implemented in another form of display through which a user may perceive a field of view. Moreover, although embodiments are described herein with respect to a see-through HMD, techniques disclosed herein may be extended to other types of HMD, which may utilize cameras to capture images of the user's environment, which are then displayed to the user. Furthermore, although examples provided herein are described as altering the visibility of a video, embodiments are not so limited. Techniques described herein can be applied similarly to any type of visual element shown on the display of an HMD, such as pictures, boxes, windows, icons, text, graphics, and the like. Textual information can, for example, serve as a messaging center for reading and/or generating messages such as short message service (SMS) messages, instant messages, email, and the like. Rich text and images can include news, editorial content, Internet content, and the like. Figures and data can convey information regarding stocks, shares, sports, scientific data, and the like. Embodiments described herein may be used to alter the visibility of such messaging center, rich text and images, figures and data, and/or or content, for example in response to detection of a triggering event.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of providing a reactive video playback interface for a head-mounted display, the method comprising:
   causing a display of the head-mounted display to show at least one visual element including a video, wherein the display is at least semi-transparent from a view of a user of the head-mounted display when no content is displayed;

detecting a triggering event using a first set of sensor data from one or more sensors;

changing a visibility of the video based on the triggering event while the video continues to be shown; and causing the display to show at least one new visual element based on the triggering event while the video continues to be shown, the at least one new visual element indicative of an environmental condition.

2. The method of claim 1, further comprising determining a context of the user, based on a second set of sensor data, wherein changing the visibility of the video is further based on the determined context.

3. The method of claim 1, wherein the triggering event comprises at least one of:
a certain movement of the user,
a transition of the user from one state of movement to another,
a proximity of an object to the user,
a proximity of the user to a specific person,
entry of the user into a vehicle,
exit of the user from a vehicle,
a pattern of events,
a loud noise, or
arrival of the user at a certain location.

4. The method of claim 3, wherein the certain movement of the user comprises at least one of:
walking, running, or lying down,
a turning of the user's head,
the user standing up,
the user sitting down, or
the user falling down.

5. The method of claim 1, wherein the one or more sensors comprise at least one of:
a motion sensor,
an inertial sensor,
a light sensor,
a microphone, or
an antenna.

6. The method of claim 5, wherein the one or more sensors are attached to the head-mounted display.

7. The method of claim 1, wherein changing the visibility of the video includes increasing a transparency of the video.

8. The method of claim 1, wherein changing the visibility of the video includes reducing a size of the video.

9. The method of claim 1, further including pausing playback of the video.

10. The method of claim 1, wherein:
detecting the triggering event comprises detecting a movement; and
changing the visibility of the video includes changing the visibility of the video in proportion to at least one of a speed or an amount of the detected movement.

11. The method of claim 1, further including:
causing the head-mounted display to playback audio related to the video; and
reducing a volume of the audio based on the triggering event.

12. A head-mounted display system comprising:
display means for displaying one or more visual elements to a user such that the user is able to at least selectively view the user's surroundings;
sensing means configured to gather sensor data;
means for causing the display means to show a visual element including a video;
means for detecting a triggering event using a first set of sensor data from the sensing means;
means for changing a visibility of the video shown with the display means, based on the triggering event, while the video continues to be shown; and
means for causing the display means to show at least one new visual element based on the triggering event while the video continues to be shown, the at least one new visual element indicative of an environmental condition.

13. The head-mounted display system of claim 12, further comprising
means for determining a context of the user, based on a second set of sensor data;
wherein the visibility change of the video is based on the determined context.

14. The head-mounted display system of claim 12, wherein the triggering event comprises at least one of:
a certain movement of the user,
a transition of the user from one state of movement to another,
a proximity of an object to the user,
a proximity of the user to a specific person,
entry of the user into a vehicle,
exit of the user from a vehicle,
a pattern of events,
a loud noise, or
arrival of the user at a certain location.

15. The head-mounted display system of claim 14, wherein the certain movement comprises at least one of:
walking, running, or lying down,
a turning of the user's head,
the user standing up,
the user sitting down, or
the user falling down.

16. The head-mounted display system of claim 12, wherein the sensing means comprises at least one of:
a motion sensor,
an inertial sensor,
a light sensor,
a microphone, or
an antenna.

17. The head-mounted display system of claim 12, wherein the means for changing comprise means for changing the visibility of the video by increasing a transparency of the video.

18. The head-mounted display system of claim 12, wherein the means for changing comprise means for changing the visibility of the video by reducing a size of the video.

19. The head-mounted display system of claim 12, further comprising means for pausing playback of the video.

20. The head-mounted display system of claim 12, further comprising:
means for detecting a movement comprising the triggering event; and
means for changing the visibility of the video in proportion to at least one of a speed or an amount of the detected movement.

21. The head-mounted display system of claim 12, further including:
audio means configured to playback audio related to the video;
wherein means for changing reduce a volume of the audio based on the triggering event.

22. A head-mounted display device comprising:
a body configured to be worn on a user's head;
a display, coupled with the body and configured to allow the user to view:
the user's surroundings, and
a visual element shown with the display;

at least one sensor configured to provide sensor data; and
a processing unit communicatively coupled to the display and the at least one sensor and configured to:
  cause the display to show the visual element, the visual element including a video;
  detect a triggering event using a first set of sensor data from the at least one sensor;
  cause the display to change a visibility of the video shown with the display, based on the triggering event, while the video continues to be shown; and
  cause the display to show at least one new visual element based on the triggering event while the video continues to be shown, the at least one new visual element indicative of an environmental condition.

23. The head-mounted display device of claim 22, wherein the processing unit is further configured to:
  determine a context of the user, based on a second set of sensor data; and
  cause the display to change the visibility of the video further based on the determined context.

24. The head-mounted display device of claim 22, wherein the processing unit is further configured to determine the triggering event by determining an event comprising at least one of:
  a certain movement of the user,
  a transition of the user from one state of movement to another,
  a proximity of an object to the user,
  a proximity of the user to a specific person,
  entry of the user into a vehicle,
  exit of the user from a vehicle,
  a pattern of events,
  a loud noise, or
  arrival of the user at a certain location.

25. The head-mounted display device of claim 24, wherein the processing unit is further configured to determine the certain movement by determining an event comprising at least one of:
  walking, running, or lying down,
  a turning of the user's head,
  the user standing up,
  the user sitting down, or
  the user falling down.

26. The head-mounted display device of claim 22, wherein the at least one sensor comprises at least one of:
  a motion sensor,
  an inertial sensor,
  a light sensor,
  a microphone, or
  an antenna.

27. The head-mounted display device of claim 22, wherein the processing unit is configured to cause the display to change the visibility of the video by increasing a transparency of the video.

28. The head-mounted display device of claim 22, wherein the processing unit is configured to cause the display to change the visibility of the video by reducing a size of the video.

29. The head-mounted display device of claim 22, wherein the processing unit is further configured to pause playback of the video.

30. The head-mounted display device of claim 22, wherein the processing unit is further configured to:
  detect the triggering event by detecting a movement; and
  change the visibility of the video in proportion to at least one of a speed or an amount of the detected movement.

31. The head-mounted display device of claim 22, wherein the processing unit is further configured to:
  cause audio related to the video to be played back; and
  reduce a volume of the audio based on the triggering event.

32. A non-transitory computer-readable medium having instructions embedded thereon for providing a reactive video playback interface for a head-mounted display, the instructions including computer-executable code for:
  causing a display of the head-mounted display to show at least one visual element including a video, wherein the display is at least semi-transparent from a view of a user of the head-mounted display when no content is displayed;
  detecting a triggering event using a set of sensor data from one or more sensors;
  changing a visibility of the video based on the triggering event while the video continues to be shown; and
  causing the display to show at least one new visual element based on the triggering event while the video continues to be shown, the at least one new visual element indicative of an environmental condition.

* * * * *